(12) United States Patent
Cai et al.

(10) Patent No.: US 9,485,317 B2
(45) Date of Patent: Nov. 1, 2016

(54) METHOD AND SYSTEM FOR MONITORING EXECUTION OF USER REQUEST IN DISTRIBUTED SYSTEM

(71) Applicant: Alibaba Group Holding Limited, George Town (KY)

(72) Inventors: Hua Cai, Hangzhou (CN); Qi Zhou, Hangzhou (CN); Tingtao Sun, Hangzhou (CN)

(73) Assignee: Alibaba Group Holding Limited, Cayman Islands (KY)

( * ) Notice: Subject to any disclaimer, the term of this patent is extended or adjusted under 35 U.S.C. 154(b) by 423 days.

(21) Appl. No.: 14/023,014

(22) Filed: Sep. 10, 2013

(65) Prior Publication Data

US 2014/0082184 A1 Mar. 20, 2014

(30) Foreign Application Priority Data

Sep. 14, 2012 (CN) .......................... 2012 1 0342909

(51) Int. Cl.
*G06F 15/173* (2006.01)
*H04L 29/08* (2006.01)
(Continued)

(52) U.S. Cl.
CPC ............. *H04L 67/22* (2013.01); *G06F 11/006* (2013.01); *G06F 11/3006* (2013.01); *G06F 11/3072* (2013.01); *G06F 11/3075* (2013.01); *G06F 11/3476* (2013.01); *G06F 2201/805* (2013.01); *G06F 2201/835* (2013.01); *H04L 43/00* (2013.01); *H04L 67/10* (2013.01)

(58) Field of Classification Search
CPC .... H04L 67/22; H04L 43/00; G06F 11/3072; G06F 11/3476; G06F 11/3075; G06F 11/3006; G06F 67/10; G06F 2201/835; G06F 2201/805

USPC .......................................................... 709/224
See application file for complete search history.

(56) References Cited

U.S. PATENT DOCUMENTS 7,185,089 B2   2/2007   Satomi et al.
7,191,440 B2   3/2007   Cota-Robles et al.
(Continued)

FOREIGN PATENT DOCUMENTS

EP    1341089      9/2003
JP    2009064124   3/2009
JP    2010118072   5/2010

OTHER PUBLICATIONS

T. Parsons et al.,"Non-intrusive end-to-end runtime path tracing for J2EE systems", IEE Proc.-Softw., vol. 153, No. 4, Aug. 2006.*
(Continued)

*Primary Examiner* — Viet Vu
*Assistant Examiner* — Herman Belcher
(74) *Attorney, Agent, or Firm* — Van Pelt, Yi & James LLP

(57) ABSTRACT

Embodiments of the present application relate to a method, a system and a computer program product for monitoring execution of a user request on a distributed system. A method for monitoring execution of user requests on a distributed system is provided. The method includes sampling a user request received by a plurality of servers, generating an identifier corresponding to the user request sampled by the plurality of servers, injecting tracking interfaces in advance into processes executed by the plurality of servers, determining whether the current process contain the identifier corresponding to the user request, in the event that the current process contains the identifier corresponding to the user request when the process has executed the tracking interface, recording information corresponding to the identifier relating to the function indicated by the tracking interface and generating a log, and individually collecting the generated log according to the corresponding identifier.

10 Claims, 9 Drawing Sheets

(51) Int. Cl.
  *G06F 11/30* (2006.01)
  *G06F 11/34* (2006.01)
  *G06F 11/00* (2006.01)
  *H04L 12/26* (2006.01)

(56) References Cited

U.S. PATENT DOCUMENTS

| | | | |
|---|---|---|---|
| 8,321,840 B2 | 11/2012 | Nagarajan et al. | |
| 2004/0267906 A1* | 12/2004 | Truty | G06F 17/30902 709/219 |
| 2005/0203952 A1* | 9/2005 | Deily | G06F 17/30902 |
| 2007/0011330 A1 | 1/2007 | Dinker et al. | |
| 2013/0097613 A1 | 4/2013 | Shin et al. | |

OTHER PUBLICATIONS

Chen, Mike Y., et al. "Pinpoint: Problem determination in large, dynamic Internet services." Dependable Systems and Networks, 2002. DSN 2002. Proceedings. International Conference on. IEEE, 2002.

* cited by examiner

| | | | | |
|---|---|---|---|---|
| [2011-08-01 16:31:31. 690272] | [ DEBUG ] | [15330] | [. /Example . cpp :117] | _TRACE_ID_:001 _FUNC_:FunctionA_start |
| [2011-08-01 16:31:31. 832724] | [ DEBUG ] | [15330] | [. /Example . cpp :117] | _TRACE_ID_:001 _FUNC_:FunctionB_start |
| [2011-08-01 16:31:32. 193131] | [ DEBUG ] | [15330] | [. /Example . cpp :122] | _TRACE_ID_:001 _FUNC_:FunctionB_end |
| [2011-08-01 16:31:32. 200272] | [ DEBUG ] | [15330] | [. /Example . cpp :117] | _TRACE_ID_:001 _FUNC_:FunctionC_start |
| [2011-08-01 16:31:33. 780275] | [ DEBUG ] | [15330] | [. /Example . cpp :122] | _TRACE_ID_:001 _FUNC_:FunctionC_end |
| [2011-08-01 16:31:33. 991376] | [ DEBUG ] | [15330] | [. /Example . cpp :122] | _TRACE_ID_:001 _FUNC_:FunctionA_start |

FIG. 2

[MBoxServer::GetMail] style:2

| Style | Count | Ratio | Avg(ms) | |
|---|---|---|---|---|
| A | 1790 | 99.77% | 7 | ☑ |
| B | 4 | 0.22% | 16 | ☑ |

[Compare]

FIG. 4

502:
```
f  1
   2 [MBoxServer::GetMail]
   3 --[ClientTableProxy::Read]
   4 ----[SendSyncRequest::SendSyncRequest]
   5 ------[SqlStorageHelper::HandleRequest]
   6 --------[SqlHelperService::OnReadRow]
   7 --[ClientTableProxy::Read]
   8 ----[SendSyncRequest::SendSyncRequest]
   9 ------[SqlStorageHelper::HandleRequest]
  10 --------[SqlHelperService::OnReadRow]
t
```

504:
```
f  1
   2 [MBoxServer::GetMail]
   3 --[ClientTableProxy::Read]
   4 ---- [SendSyncRequest::SendSyncRequest]
   5 ------[SqlStorageHelper::HandleRequest]
   6 --------[SqlHelperService::OnReadRow]
   7 --[ClientTableProxy::Read]
   8 ----[SendSyncRequest::SendSyncRequest]
   9 ------[SqlStorageHelper::HandleRequest]
  10 --------[SqlHelperService::OnReadRow]
t 11 ----------[YouchaoFile::ReadPangu]
```

Legends

| Colors | Links |
|---|---|
| Added | (f)irst change |
| Changed | (n)ext change |
| Deleted | (t)op |

FIG. 5

| Function Name | Max(us) | Min(us) | Avg(us) | Ratio | |
|---|---|---|---|---|---|
| [MBoxServer::GetMail] | 212089 | 3600 | 6999 | ▭▭▭▭▭▭▭ | 100% |
| -- [ClientTableProxy::Read] | 22802 | 1072 | 2470 | ▭▭ | 35% |
| ---- [SendSyncRequest::SendSyncRequest] | 22570 | 954 | 2331 | ▭▭ | 33% |
| ------[SqlStorageHelper::HandleRequest] | 943 | 252 | 522 | ▫ | 7% |
| --------[SqlHelperService::OnReadRow] | 557 | 67 | 174 | ▫ | 2% |
| --[ClientTableProxy::Read] | 204075 | 971 | 2409 | ▭▭ | 34% |
| ----[SendSyncRequest::SendSyncRequest] | 203877 | 895 | 2278 | ▭▭ | 33% |
| ------[SqlStorageHelper::HandleRequest] | 1752 | 346 | 702 | ▫ | 10% |
| --------[SqlHelperService::OnReadRow] | 965 | 101 | 350 | ▫ | 5% |

METHOD AND SYSTEM FOR MONITORING EXECUTION OF USER REQUEST IN DISTRIBUTED SYSTEM

CROSS REFERENCE TO OTHER APPLICATIONS

This application claims priority to People's Republic of China Patent Application No. 201210342909.6 entitled A METHOD AND DEVICE FOR MONITORING THE RUNNING OF USER REQUESTS IN DISTRIBUTED SYSTEMS, filed Sep. 14, 2012 which is incorporated herein by reference for all purposes.

FIELD OF THE INVENTION

The present application relates to a method and a system for monitoring execution of a user request in a distributed system.

BACKGROUND OF THE INVENTION

In large distributed systems, user application service requests often pass through many service modules before being executed. For example, in Alibaba's cloud computing platform, a single operation request by a user passes through scheduling, communications, indexing, distributed storage, and other service modules before the completion of many operations such as updating the index buffer, maintaining meta-information, writing files, and writing access logs. These service modules typically are deployed on different processes on hundreds of servers and are constructed from different software programs.

Currently, monitoring and analyzing user-invoked distributed system behaviors are often concentrated on a single service component of a distributed system, such as, for example, monitoring, reading, and writing of a file system or monitoring the throughput of an upper-level system. Such a monitoring approach only analyzes a single service module and is unable to accurately obtain an effect of a user's application service request on the overall distributed system.

BRIEF DESCRIPTION OF THE DRAWINGS

Various embodiments of the invention are disclosed in the following detailed description and the accompanying drawings.

FIG. 2 is an example of an outputted log.

FIG. 4 is an example of an analysis of a log.

FIG. 5 is a detailed example of the analysis of the log.

FIG. 6 is an example of compiling statistics based on logs.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
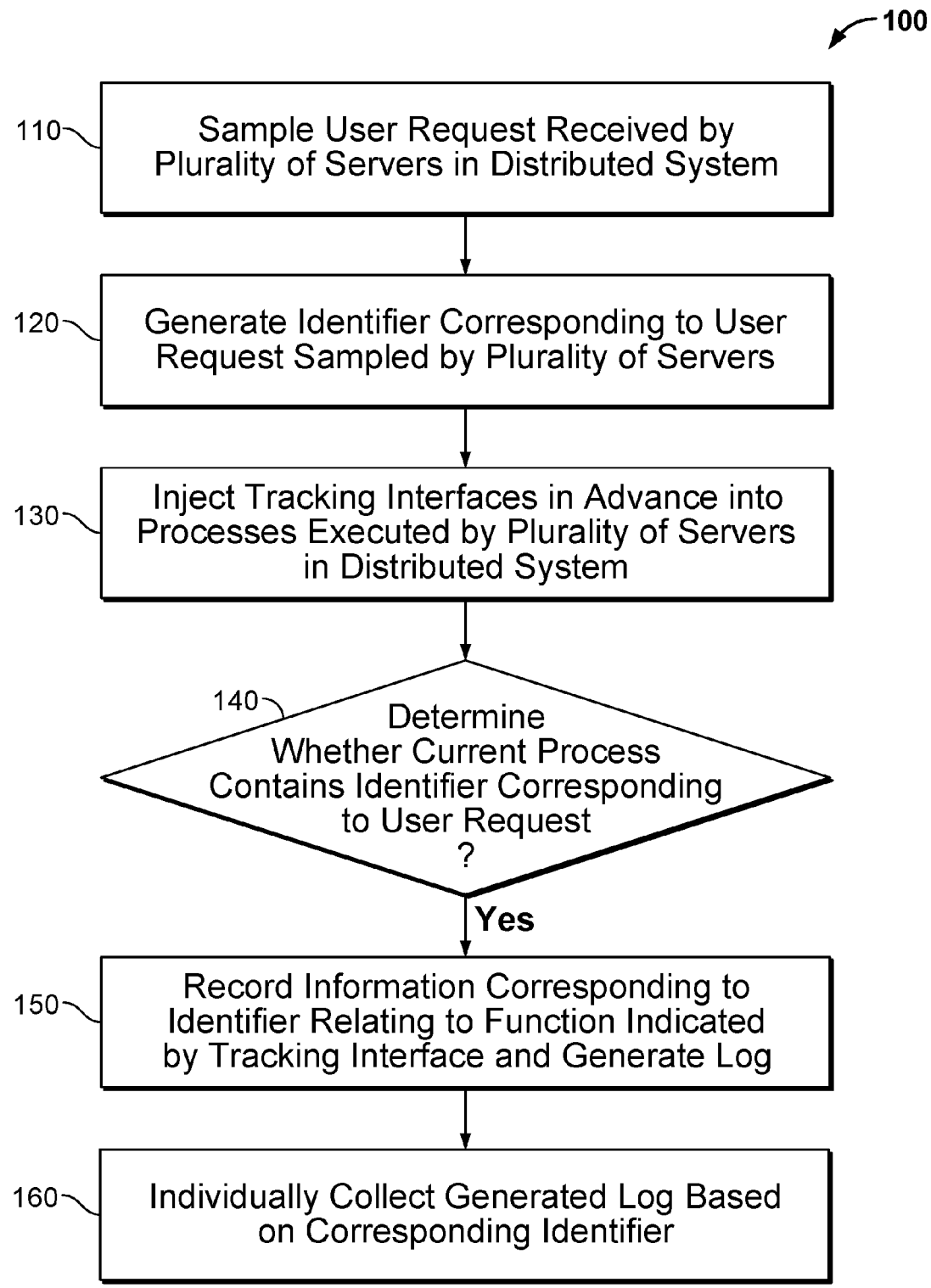
FIG. 1 is a flow diagram of an embodiment of a process for monitoring execution of a user request.

FIG. 1 is a flow diagram of an embodiment of a process for monitoring execution of a user request. In some embodiments, the process 100 is implemented by a server 910 of FIG. 9 and includes:

In 110, the server samples user requests received by a plurality of servers in a distributed system.

In 120, the server generates identifiers corresponding to the user requests sampled by the plurality of servers. In some embodiments, the identifiers are sent as variables to a current thread when the user requests invoke threads. In some embodiments, each thread has local storage having a storage interface for reading and writing data. In some embodiments, the variables are stored in the storage interfaces.

In 130, the server injects tracking interfaces in advance into processes executed by the plurality of servers in the distributed system.

An example of the tracking interface below illustrates two concepts: the tracking interface and how to switch on and off the tracking interface.

```
FunctionB( ) {
    TRACE_LOG (FunctionB, ("Message", "exception throw")
    ("User","100240"));
}
```

In the above example, the code for the tracking interface is manually injected. The switching of the tracking interface is not determined by the tracking interface. Instead, the switching is based on whether the current identifier is set to 0 or not.

In 140, the server determines whether a currently executing process (current process) contains an identifier corresponding to a user request when the process executed includes an injected tracking interface.

In 150, in the event that the current process containing the identifier corresponding to the user request, the server records information corresponding to the identifier relating to the function indicated by the tracking interface and generates a log.

In 160, the server individually collects the generated log based on the corresponding identifier.

In order to decrease a disturbance effect of monitoring a distributed system performance and to ensure that the monitoring system does not consume too heavy a load, the user requests received by the plurality of servers in the distributed system generally undergo random sampling according to a ratio of 1% to 5%. The sampled user requests are collectively tracked in invoked individual threads, with corresponding logs generated.

As an example, the tracking of the sampled user requests is based on the identifiers corresponding to the user requests. Furthermore, when the identifiers corresponding to the user requests sampled by the plurality of servers are generated, the server ensures that the generated identifiers are unique within the distributed system. For example, identifiers that uniquely correspond to user requests are generated according to a set algorithm. In some embodiments, the algorithm generates the identifiers based on sampled user request send times and markers of request-receiving servers for the user requests sampled by the plurality of receiving servers. There are no limitations imposed on the algorithm for generating the identifiers.

To ensure that the sampled user requests are effectively detected in processes executed by the plurality of servers, the identifiers corresponding to the user requests are sent as variables to the threads currently invoked by the user requests. In some embodiments, when user requests in the same process invoke different threads, the identifiers are retained in the thread local storage (TLS). When a process creates sub-processes, the server sends identifiers to the sub-processes. When a user request spans processes and invokes different threads, an identifier is sent via a communication protocol to all the processes. The following is an example of a communication protocol:

[Header]
TracerID: 1001234311111(Identifier)
[Body]
[Original transmitted content]

In some embodiments, when a network module sends a network request, an identifier is obtained from the thread, placed in the header of the network request, and sent to a receiving terminal. The receiving terminal extracts the identifier from the received network request and sends the identifier to the thread that is currently processing the network request.

In some embodiments, for each server in the distributed system, the server injects tracking interfaces, in advance, in processes to be monitored. For example, a tracking interface corresponds to a TRACE_LOG interface in Windows™ operating system.

For example, when a function is executed, the server determines whether the identifier is 0. If the identifier is not 0, the server outputs the content and value of the identifier of the current TRACE_LOG to the log.

The tracking interface explicitly adds, at the injection point, descriptive information related to the type of injection point. In some embodiments, all of the tracking interfaces adopt Resource Acquisition Is Initialization (RAII) programming specifications. In other words, the tracking interfaces complete system resource releases and requests. In some embodiments, through the tracking interfaces, timestamps for user request injection point entries and exits are individually recorded by constructor and destructor functions and incorporated into logs.

In some embodiments, injection probe tracking is implemented through the code below:

```
FunctionB( ){
    TRACE_LOG(FunctionB);
    ......
}
FunctionC( ){
    TRACE_LOG(FunctionC);
    ......
}
FunctionA( ){
    TRACE_LOG(FunctionA);
    FunctionB( );
    FunctionC( );
    ......
}
Main(...){
    ENABLE_TRACE( );
    FunctionA( );
}
```

Thus, whenever a program of the plurality of servers in the distributed system reaches a TRACE_LOG interface, the program determines whether a currently executing process contains an identifier corresponding to the user request.

An example, the identifier is used by the thread function when the function is invoked. If the value of the identifier corresponds to 0 (meaning the request was not sampled), nothing is output. If the value of the identifier is not equal to 0 (the request has been sampled), the value of the identifier and log contents are output to the log to be processed.

In the event that the program determines that the currently executing process contains the identifier corresponding to the user request, the server acquires the identifier from the thread. The server records information relating to the function indicated by the tracking interface. For example, the identifier and the information including the name and location of the invoked function, the time when the function was invoked, error information generated at the time when the function was invoked are output to the log, or any combination thereof.

FIG. 2 is an example of an outputted log. In the outputted log, "TRACE_ID_:001" indicates that the identifier is for request 001, "_FUNC_:FunctionA_start" indicates a start time of "FunctionA," "_FUNC_:FunctionA_end" indicates an end time of "FunctionA," and "/Example.cpp:117" is supplemental information indicating that the log is located on line 117 of "Example.cpp."

In the event that the program determines that the currently executing process does not contains an identifier corresponding to the user request, the server does not execute any operation. In other words, in the event that no identifier has been set up or the identifier is 0, the identifier indicates that the user request that invoked the process is not being tracked or monitored.

In some embodiments, in 160, after generating logs for all of the servers in the distributed system, the server, via a background collection procedure, collects logs at regular intervals at processing servers and inter-relates the collected logs. In other words, the collecting operation is implemented according to different identifiers. For example, logs with the same identifier are collected as the same type.

Figure 3:
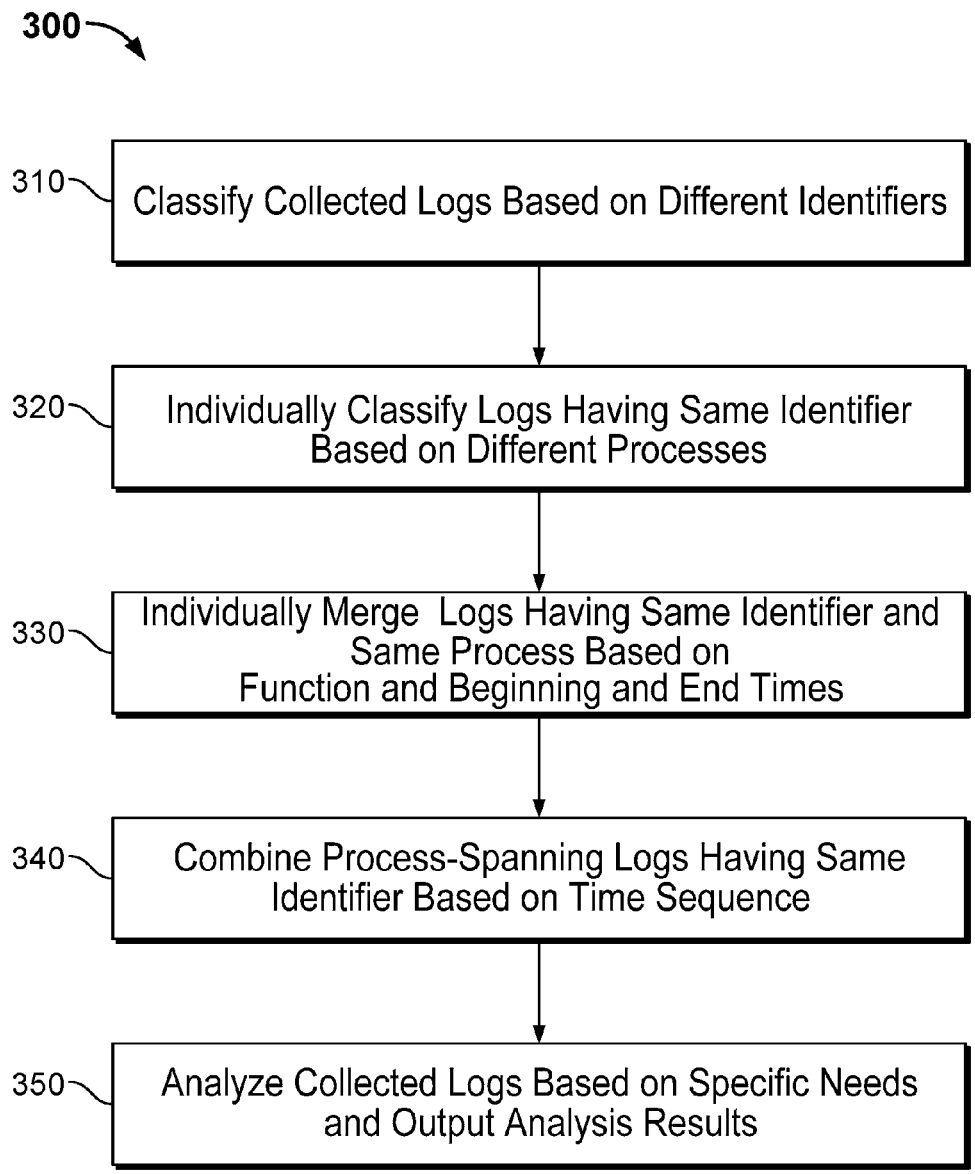
FIG. 3 is a flow diagram of an embodiment of a process for collecting a log.

FIG. 3 is a flow diagram of an embodiment of a process for collecting a log. In some embodiments, the process 300 is an implementation of 160 of FIG. 1 and comprises:

In 310, the server individually classifies the collected logs based on the different identifiers.

In 320, the server individually classifies logs having the same identifier based on different processes.

In 330, the server individually merges logs having the same identifier and the same process based on function and beginning and end times.

In 340, the server combines process-spanning logs having the same identifier based on time sequence.

In 350, after the logs are collected, the server analyzes the collected logs based on specific needs and outputs the analysis results. For example, the server analyzes the collected logs to combine different identifiers and thus to form raw data for analysis. In some embodiments, visualized/analytic frameworks are used to interpret program execution modes to enable convenient analysis of how user requests are executed in programs.

In some embodiments, one or more of the following analyses of the logs is performed:

1. The server performs different-path analysis on user requests having the same form of invocation. In some embodiments, in the distributed system, the same form of invocation gives rise to different behaviors because of different system statuses. For example, the distributed system has the same two kinds of responses regarding whether a cache is hit. By counting different invocation behaviors for the same processing mode, analyzing the true processing status of the distributed system is possible. FIG. 4 is an example of an analysis of a log. For example, regarding the processing of the same MailBox::GetMail, two different behaviors (A and B), which account for 99.77% and 0.22% of the total, respectively, exist. FIG. 5 is a detailed example of the analysis of the log. The detailed analysis illustrates the difference between behavior A and behavior B. As an example, 502 left side of FIG. 5 illustrates behavior A and 504 right side of FIG. 5 illustrates behavior B.

2. The server performs an analysis of user request run paths in the distributed system and of run times. FIG. 6 is an example of compiling statistics based on logs. Compiling statistics on user request invocation data and of the time expended running the user request in processes of the plurality of servers based on the collected user request logs is possible.

Figure 7:
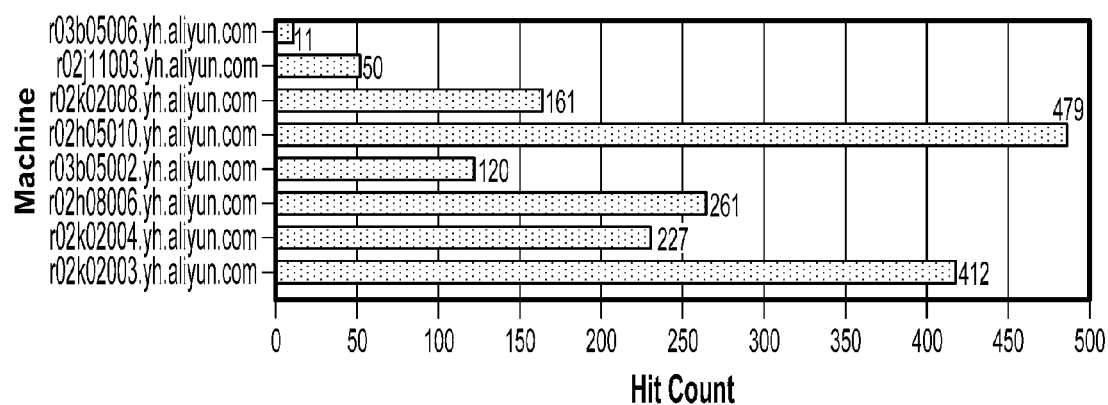
FIG. 7 is an example of a user request distribution.

3. The server invokes a frequency analysis of all of the modules in the distributed system. In addition to allowing examination of the mean and maximum values of each user request frequency in each module, the analysis also enables one to examine the distribution of program invocation statuses based on different dimensions, i.e., in terms of time, identifiers, and equipment. FIG. 7 is an example of a user request distribution.

Furthermore, a system for monitoring a user request executed in a distributed system corresponding to the method is provided. The principles according to which this system performs are similar to the above method for monitoring the user request executed in the distributed system. Therefore, in implementing the system, the implementation of the method can be referenced. Repeated sections are not discussed further for conciseness.

Figure 8:
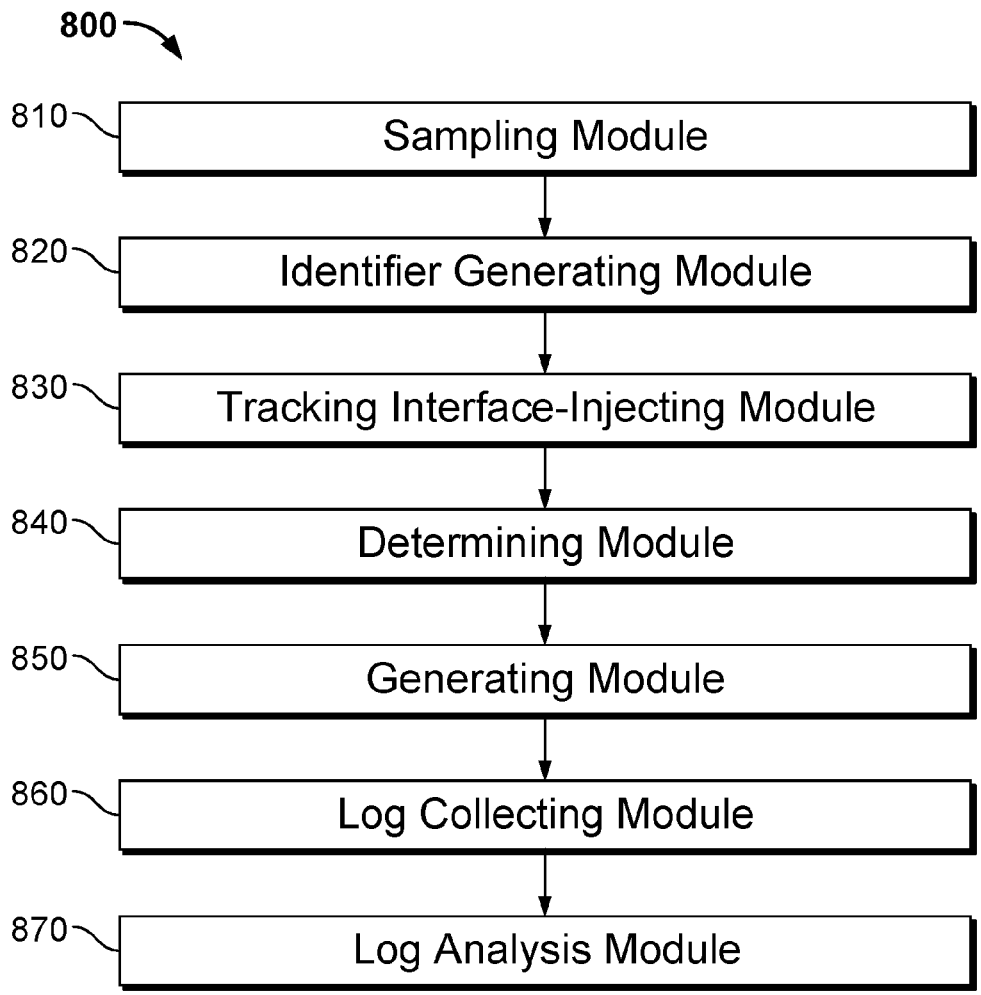
FIG. 8 is a structural diagram of an embodiment of a system for monitoring execution of a user request.

FIG. 8 is a structural diagram of an embodiment of a system for monitoring execution of a user request. In some embodiments, the system 800 includes a sampling module 810, an identifier generating module 820, a tracking interface-injecting module 830, a determining module 840, generating module 850, a log collecting module 860, and a log analysis module 870.

The sampling module 810 samples user requests received by a plurality of servers in a distributed system.

The identifier generating module 820 generates identifiers corresponding to the user requests sampled by the various servers. In some embodiments, the identifiers are sent as variables to a current thread in the event that the user requests invoke threads.

The tracking interface-injecting module 830 injects tracking interfaces in advance into processes executed by the various servers in the distributed system.

The determining module 840 determines whether a current process contains an identifier corresponding to a user request when the process executed includes an injected tracking interface.

In the event that the current process is detected as containing the identifier corresponding to the user request when the process executed includes the tracking interface, the generating module 850 records information corresponding to the identifier relating to the function indicated by the tracking interface and generates a log.

The log collecting module 860 individually collects the generated logs based on the corresponding identifiers.

The log analysis module 870 analyzes the collected logs and outputs the analysis results. As an example, the analysis includes one or more of the following methods: 1) performing different-path analysis on user requests having the same form of invocation; 2) performing analysis of user request run paths in a distributed system and of run times in the various modules; and 3) invoking frequency analysis of the various modules in the distributed system.

Figure 9:
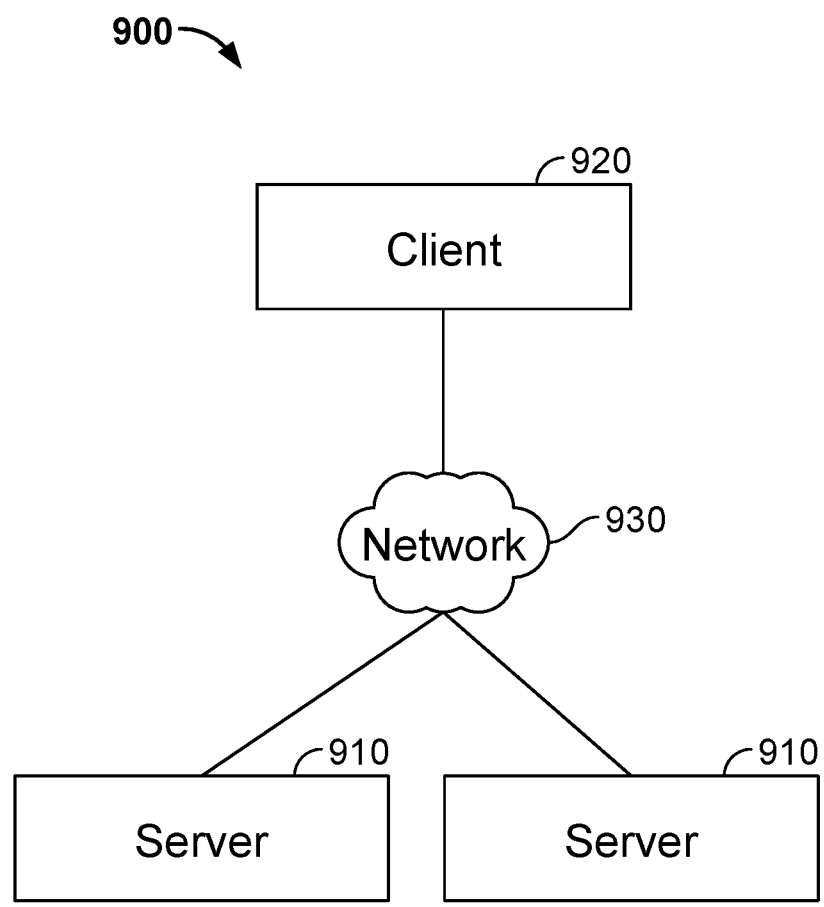
FIG. 9 is a schematic diagram of an embodiment of a system for monitoring execution of a user request.

FIG. 9 is a schematic diagram of an embodiment of a system for monitoring execution of a user request. The system 900 includes a plurality of servers 910 and a client 920. A server 910 is connected to the client 920 over a network 930.

For example, the client 920 sends a user request via the network 930 to one of the servers 910 in the system 900.

A method and system for monitoring user requests executed in a distributed system are provided. When a user accesses a distributed system, the user request received by the distributed system is sampled, and an identifier corresponding to the sampled user request is generated. The identifier is sent to each thread invoked by the user request. Tracking interfaces are inserted into processes executed by a plurality of servers of the distributed system. In the event that the current process is detected as containing the identifier corresponding to the user request when each of such processes reaches the tracking interface, information corresponding to the identifier relating to the function indicated by the tracking interface is recorded, and a log is generated. Subsequently, the generated logs are individually collected based on their corresponding identifiers. Because the user requests are sample-monitored using a sampling method during monitoring of user requests, the impact on system performance is low. Thus, the monitoring system is not subject to excessive strain. Moreover, the logs that are generated by the plurality of servers in monitoring the distributed system are collected in real time based on the identifiers of the user requests, allowing for possible support for real-time analysis of user request behavior.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of monitoring execution of user requests in a distributed system, comprising:
    sampling a first user request received by a plurality of servers in a distributed system;
    generating an identifier corresponding to the first user request sampled by the plurality of servers, the identifier being sent as a variable to a current thread that is invoked by the first user request, and wherein:
        in the event that a first process relating to the first user request is the same as a second process relating to a second user request, a different thread is invoked from a thread invoked by the second user request, and the identifier is retained in a thread variable relating to the different thread;
        in the event that the first process has created a plurality of sub-processes, the identifier is sent to the plurality of sub-processes; and
        in the event that the first user request spans a plurality of processes and invokes one or more different threads different from the current thread, the identifier is sent via a communication protocol to the plurality of processes;
    injecting tracking interfaces in advance into processes executed by the plurality of servers in the distributed system; and
    determining whether the current process contains the identifier corresponding to the first user request.

2. The method as described in claim 1, wherein the sampling of the first user request received by the plurality of servers in the distributed system includes:
    conducting a random sampling of the first user request received by the plurality of the servers in the distributed system based on a ratio of 1% to 5%.

3. The method as described in claim 1, wherein the generating of the identifier corresponding to the first user request sampled by the plurality of servers includes:
    generating the uniquely corresponding identifier based on a user request send time and a marker of the request-receiving server for the first user request sampled by the plurality of receiving servers.

4. The method as described in claim 1, wherein the recording of the information corresponding to the identifier relating to the function indicated by the tracking interface and the generating of the log includes:
    outputting the identifier, a name and location of the invoked function, a time when the function was invoked, error information generated at a time of invoking to the log, or any combination thereof.

5. The method as described in claim 1, wherein the individually collecting of the generated log according to the corresponding identifier includes:
    individually classifying received logs according to different identifiers;
    individually classifying logs that have the same identifier according to different processes;
    individually merging logs that have the same identifier and the same process according to the function and according to invoking beginning and end times; and
    combining process-spanning logs that have the same identifier according to the time sequence.

6. The method as described in claim 1, further comprising:
    after the individually collecting of the generated log, analyzing the collected log and outputting an analysis result.

7. The method as described in claim 6, wherein the analyzing of the collected log comprises:
    performing different-path analysis on a third user request having the same form of invocation;
    analyzing a user request run path in the distributed system and a run time in a module;
    invoking frequency analysis in the module in the distributed system; or
    any combination thereof.

8. A system for monitoring execution of user requests on a distributed system, comprising: at least one processor configured to:
    sample a first user request received by a plurality of servers in a distributed system;
    generate an identifier corresponding to the first user request sampled by the plurality of servers, the identifier being sent as a variable to a current thread that is invoked by the first user request, and wherein:
        in the event that a first process relating to the first user request is the same as a second process relating to a second user request, a different thread is invoked from a thread invoked by the second user request, and the identifier is retained in a thread variable relating to the different thread;
        in the event that the first process has created a plurality of sub-processes, the identifier is sent to the plurality of sub-processes; and
        in the event that the first user request spans a plurality of processes and invokes one or more different threads different from the current thread, the identifier is sent via a communication protocol to the plurality of processes;
    inject tracking interfaces in advance into processes executed by the plurality of servers in the distributed system; and
    determine whether the current process contains the identifier corresponding to the first user request; and
    a memory coupled to the at least one processor and configured to provide the at least one processor with instructions.

9. The system as described in claim 8, wherein the at least one processor further configured to:
   after the collecting of the generated log:
   perform different-path analysis on a third user request having the same form of invocation;
   analyze a user request run path in the distributed system and run time in a module;
   invoke frequency analysis in the module in the distributed system; or
   any combination thereof.

10. A computer program product for monitoring execution of user requests on a distributed system, the computer program product being embodied in a tangible non-transitory computer readable storage medium and comprising computer instructions for:
   sampling a first user request received by a plurality of servers in a distributed system;
   generating an identifier corresponding to the first user request sampled by the plurality of servers, the identifier being sent as a variable to a current thread that is invoked by the first user request, and wherein:
   in the event that a first process relating to the first user request is the same as a second process relating to a second user request, a different thread is invoked from a thread invoked by the second user request, and the identifier is retained in a thread variable relating to the different thread;
   in the event that the first process has created a plurality of sub-processes, the identifier is sent to the plurality of sub-processes; and
   in the event that the first user request spans a plurality of processes and invokes one or more different threads different from the current thread, the identifier is sent via a communication protocol to the plurality of processes;
   injecting tracking interfaces in advance into processes executed by the plurality of servers in the distributed system; and
   determining whether the current process contains the identifier corresponding to the first user request.

* * * * *